Patented July 26, 1932

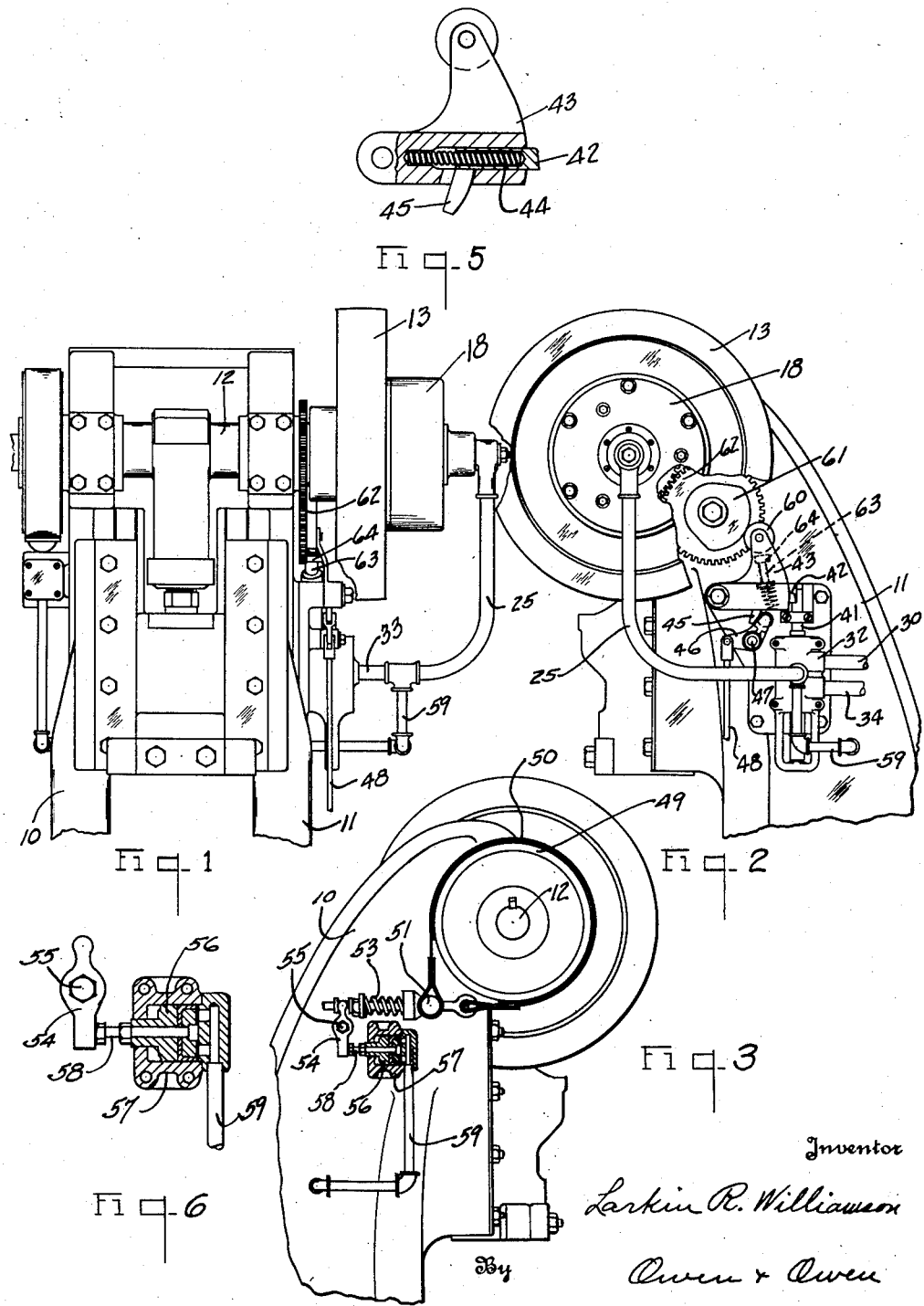

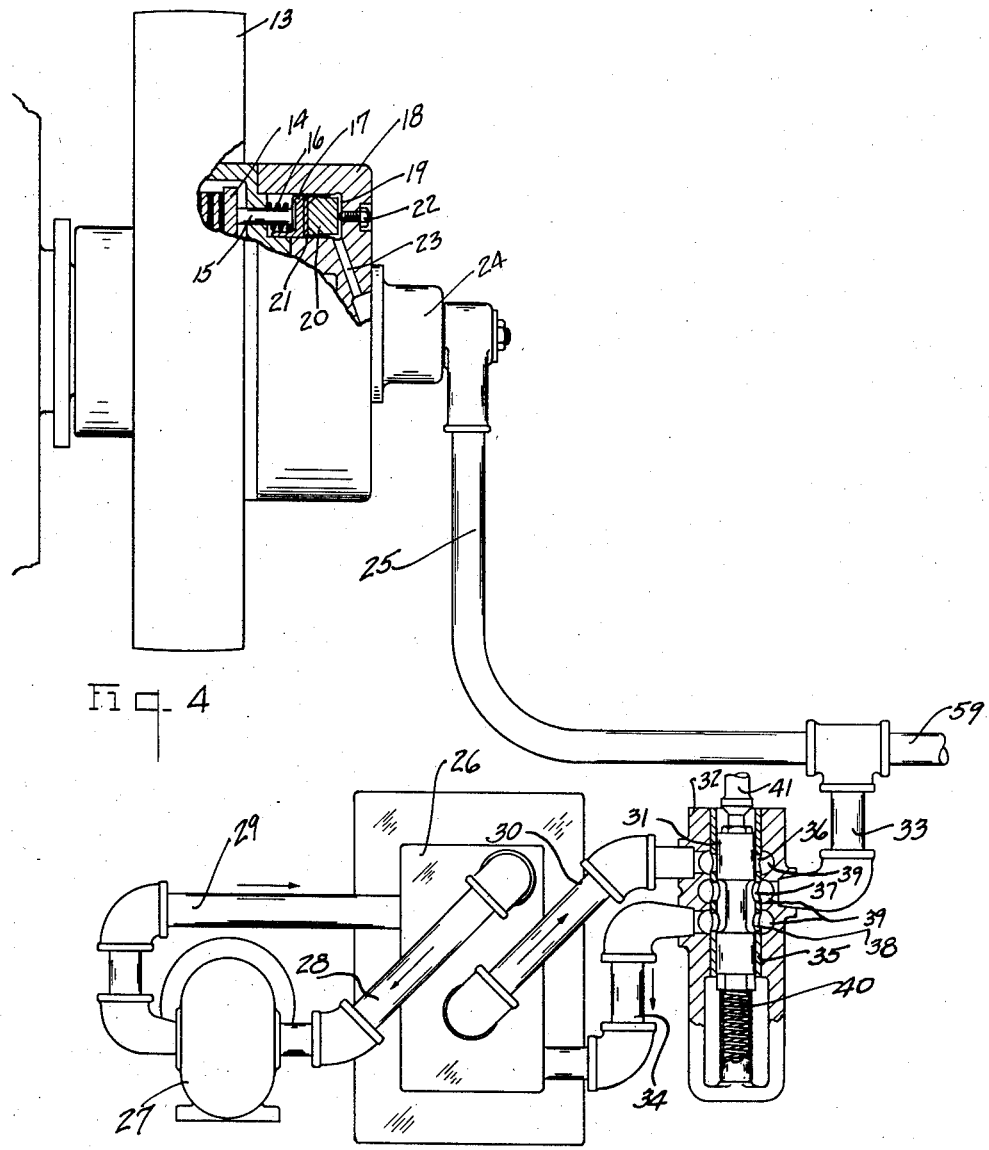
July 26, 1932. L. R. WILLIAMSON 1,869,085
FLUID PRESSURE CONTROL DEVICE
Filed April 18, 1931  2 Sheets-Sheet 2

1,869,085

UNITED STATES PATENT OFFICE

LARKIN R. WILLIAMSON, OF TOLEDO, OHIO, ASSIGNOR TO THE TOLEDO MACHINE
& TOOL COMPANY, OF TOLEDO, OHIO, A CORPORATION OF OHIO

FLUID PRESSURE CONTROL DEVICE

Application filed April 18, 1931. Serial No. 531,066.

This invention relates to a fluid pressure control device for a clutch or other intermittently operated mechanism.

The general object of the invention is to provide a device of the character stated which is of simple construction and reliable in its operation under all conditions.

As an example of one adaptation of the invention, it is illustrated in the accompanying drawings as associated with the clutch and brake of a power press and is connected with a suitable source of fluid pressure, preferably the high pressure side of a fluid pressure accumulator.

The invention will be more particularly described in connection with the accompanying drawings, in which—

Figure 1 is a front elevation of the upper portion of a power press with which the invention is associated;

Figure 2 is an end elevation of the mechanism shown in Fig. 1;

Figure 3 is an elevation as viewed from the opposite end of the device, parts being shown in section;

Figure 4 is a more or less diagrammatic view of the pressure system, with parts of the clutch and control valve shown in section;

Figure 5 is a detail view of the trip latch and lever;

Figure 6 is a detail view of the fluid pressure control for the brake.

The invention, as illustrated in the drawings, is associated with a power press having end frame members 10 and 11, in which there is journaled a crank shaft 12 adapted to be driven by a wheel 13 through the medium of a clutch 14. The engagement of the clutch is controlled by pins 15 which are normally held by springs 16 in position to release the clutch but are adapted to be advanced into clutch engaging position by a pressure ring 17 contained within a housing 18. The housing 18 is provided with a channel 19 of sufficient depth to receive a plunger 20 which is adapted to be advanced by fluid pressure and through which the pressure ring 17 is advanced for effecting engagement of the clutch. The plunger 20 is covered by a packing 21 to prevent leakage and the plunger is held in spaced relation to the bottom of the channel 19 by screws 22 or the like, in order that fluid pressure admitted through passageways 23 may be equally distributed behind the plunger, and also to limit the travel of the clutch.

For operating the clutch, fluid under pressure, preferably oil, is admitted into the channel 19 through the passageways 23 from a common inlet 24 which is connected with a pipe 25 adapted to be connected to the high pressure side of a fluid pressure accumulator 26. Fluid for operating the clutch is continuously maintained under pressure within the accumulator 26 by means of a pump 27 which may be driven from the press mechanism or in any other suitable manner to draw the spent fluid through the pipe 28 from the low pressure side of the accumulator and to force it through the pipe 29 to the high pressure side. Fluid under pressure is adapted to be supplied from the accumulator 26 through pipe 30, past a valve 31 within the housing 32, and through the pipe 33 and pipe 25 to the plunger housing 18 for operating the clutch. For releasing the clutch, the valve 31 is shifted to relieve the fluid pressure from the housing 18 and to return it through pipes 25, 33 and 34 to the low pressure side of the accumulator 26. The specific construction of the fluid pressure accumulator constitutes no part of the present invention, since any suitable source of fluid pressure may be used.

The valve 31 is in the present instance in the form of a double headed piston reciprocable within a cylinder 35 disposed within the housing 32. The cylinder 35 is provided with series of ports 36, 37 and 38 and for equalizing the distribution of pressure, the housing 32 is formed with an annular channel 39 about each series of ports. The ports 36 are at all times in communication with the pipe 30, the ports 37 in communication with the pipe 33, and the ports 38 in communication with the return pipe 34. Thus by shifting the valve 31, the pipe 33 leading to the clutch may be placed in communication with the pressure supply pipe 30 or with the return or exhaust pipe 34.

A spring 40 urges the valve 31 into position to admit pressure to the clutch to cause the engagement thereof, but the valve is normally held in clutch releasing position in opposition to the action of the spring 40, by reason of the engagement of the valve stem 41 by a latch 42 which is mounted in a lever 43 and adapted to be projected by means of a spring 44. The latch 42 has a trip arm 45 engageable by a lever 46 which is fulcrumed at 47 and is actuated through a trip rod 48 to retract the latch and permit the valve 31 to be shifted by the spring 40 into position to admit pressure to the clutch to cause the engagement of the latter.

A brake drum 49 is secured to the end of the crank shaft 12 opposite to the drive wheel 13 and a brake band 50 is adapted to engage the brake drum when the clutch is released and to release the brake drum when the clutch is engaged. For this purpose, one end of the brake band is connected to a fixed bracket 51 while the other end is connected to a spindle 52 which is adapted to be actuated by a spring 53 to set the brake. The brake is released by a lever 54 which is fulcrumed at 55. For actuating the lever 54 in opposition to the spring 53, a piston 56 is mounted in a housing 57 and has a stem 58 which engages the lever 54 and which may be adjusted to secure the proper action of the brake. The piston housing 57 is connected by a pipe 59 to the pressure supply pipe 33 so that whenever pressure is admitted to the housing 18 to cause engagement of the clutch, pressure is also admitted to the housing 57 to operate the piston and to release the brake.

In the usual operation of a power press, after the clutch is engaged, it is customary to operate the press through one complete cycle and then to have the clutch automatically released. For this purpose, the lever 43 is provided with a roller 60 which rides on a cam 61 driven from the crank shaft 12 through suitable gearing 62, the roller being held in contact with the cam by a spring held plunger 63 which engages a lug 64 on the lever 43. Whenever the trip rod 48 is actuated to retract the latch, the valve 31 is raised to admit pressure to the housing 18 for effecting the engagement of the clutch. As the crank shaft now rotates, the roller 60 riding over the lower portion of the cam 61 permits the lever 43 to swing upwardly until the latch 42 again engages the shoulder at the upper end of the valve stem 41. As the crank shaft completes its rotation the roller 60 again rides upon the high portion of the cam 61 and causes the lever 43 again to swing downwardly and to shift the valve 31 back to its initial position, relieving the pressure in the housing 18 and releasing the clutch.

While I have shown and described in detail one specific form of the invention, it is apparent that the same may be modified to a considerable extent without departing from the spirit and scope of the invention as defined by the appended claims.

What I claim is:

1. The combination with a rotatable member, of a clutch therefor, fluid pressure operable means for causing engagement of the clutch, a valve for controlling said fluid pressure, a member for shifting the valve to render the fluid pressure operative, means driven by said rotatable member to actuate said valve shifting member to shift the valve as stated after a predetermined operation of said rotatable member, and tripping means for moving the valve shifting member to release the valve while said tripping means remains in its valve actuating position.

2. The combination with a rotatable member, of a fluid pressure controlled clutch therefor, a valve for controlling the fluid, a pivotally supported slidable latch, means driven by said rotatable member to swing said latch about its pivot to engage and actuate the fluid control valve to release the clutch, after a predetermined cycle of operation, and manually operable tripping means for retracting said latch to release the valve.

3. The combination with a rotatable member, of a clutch therefor, resilient means normally acting to hold the clutch disengaged, fluid pressure operable means to cause engagement of the clutch in opposition to said resilient means, a valve for controlling the fluid presure, resilient means for normally holding the valve in position to admit fluid pressure to the clutch, a cam driven by said rotatable member, means actuated by the cam, when in a predetermined position, to shift the valve to cut off fluid pressure and release the clutch, and tripping means operable while the cam is still in actuating position to release said valve to render the clutch again operative.

4. The combination with a rotatable member, of a fluid pressure controlled clutch therefor, a spring held valve for controlling the fluid pressure, a pivotally mounted lever, a latch reciprocably mounted on said lever and engageable with said valve, a cam driven by said rotatable member and engageable with said lever to rock the latter with the latch to cause the latch to engage and shift the valve, and tripping means to retract the latch and release said valve while the lever is still engaged by the cam.

5. The combination with a rotatable member, of a clutch therefor, yieldable means normally acting to hold the clutch disengaged, fluid pressure operable means to cause the engagement of the clutch in opposition to said yieldable means, a valve for controlling the fluid pressure, resilient means for normally holding the valve in position to admit fluid pressure to the clutch, a pivotally mounted lever, a latch reciprocably mounted on said lever and engageable with said valve, a cam driven by said rotatable member and engageable with said lever to rock the same with the latch to cause the latter to engage and shift the valve in opposition to said resilient means, and tripping means to retract the latch and release said valve while the lever is still engaged by the cam.

6. The combination with a rotatable member, of a clutch for driving said member, a brake for said member, yieldable means tending to disengage the clutch and set the brake respectively, a fluid pressure system operable to shift the brake and clutch in opposition to said yieldable means, a valve for controlling the fluid pressure, a resilient means normally holding the valve in position to admit fluid pressure to said system, a pivotally mounted lever, a latch reciprocably mounted on said lever and engageable with said valve, a cam driven by said rotatable member and engageable with said lever to rock the same with the latch to cause the latter to engage and shift the valve in opposition to said resilient means, and tripping means to retract the latch and release said valve while the lever is still engaged by the cam.

In testimony whereof I have hereunto signed my name to this specification.

LARKIN R. WILLIAMSON.